United States Patent
Yamazaki et al.

(10) Patent No.: US 8,348,321 B2
(45) Date of Patent: Jan. 8, 2013

(54) VEHICLE BODY STRUCTURE FOR FITTING PILLAR GARNISH AND FENDER PANEL

(75) Inventors: Tomoya Yamazaki, Tochigi (JP); Toshihiko Hatakeyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 200 days.

(21) Appl. No.: 12/906,297

(22) Filed: Oct. 18, 2010

(65) Prior Publication Data
US 2011/0089719 A1 Apr. 21, 2011

(30) Foreign Application Priority Data

Oct. 19, 2009 (JP) .................................. 2009-239954

(51) Int. Cl.
B62D 25/02 (2006.01)

(52) U.S. Cl. ............. 296/1.08; 296/193.05; 296/193.06; 296/198; 296/203.03

(58) Field of Classification Search ............. 296/193.05, 296/193.06, 198, 191, 29, 30, 203.03, 1.08
See application file for complete search history.

(56) References Cited

U.S. PATENT DOCUMENTS

| | | | | |
|---|---|---|---|---|
| 5,655,811 | A * | 8/1997 | Sekine et al. ................. | 296/198 |
| 6,428,074 | B1 * | 8/2002 | Sukegawa et al. ............ | 296/29 |
| 6,435,602 | B1 * | 8/2002 | Sukegawa et al. ........... | 296/191 |
| 7,083,224 | B2 * | 8/2006 | Yamamura et al. ........... | 296/198 |
| 7,651,158 | B2 * | 1/2010 | Koizumi et al. ......... | 296/203.02 |
| 7,695,039 | B2 * | 4/2010 | Sakamoto .................... | 296/1.08 |
| 7,841,636 | B2 * | 11/2010 | Huth et al. .................... | 296/1.08 |
| 7,845,713 | B2 * | 12/2010 | Terai et al. ............... | 296/193.06 |
| 7,909,392 | B2 * | 3/2011 | Takeuchi et al. .............. | 296/198 |
| 7,954,885 | B2 * | 6/2011 | Sase ................................ | 296/191 |
| 7,980,613 | B2 * | 7/2011 | Murray et al. ................ | 296/1.08 |
| 7,988,227 | B2 * | 8/2011 | Kanada et al. ................ | 296/198 |
| 2007/0164585 | A1 * | 7/2007 | Hasegawa et al. ....... | 296/193.06 |
| 2007/0262615 | A1 * | 11/2007 | Koizumi et al. .............. | 296/201 |
| 2011/0049934 | A1 * | 3/2011 | Kanada et al. ........... | 296/193.04 |
| 2011/0089719 | A1 * | 4/2011 | Yamazaki et al. ........ | 296/193.06 |
| 2011/0187141 | A1 * | 8/2011 | Yanai et al. ................... | 296/1.08 |
| 2011/0204671 | A1 * | 8/2011 | Baratin .......................... | 296/93 |

FOREIGN PATENT DOCUMENTS

| | | |
|---|---|---|
| JP | 62-068120 | 3/1987 |
| JP | 2000-177506 | 6/2000 |
| JP | 2005-119456 | 5/2005 |
| JP | 2007-308015 | 11/2007 |
| JP | 2009-202838 | 9/2009 |

* cited by examiner

*Primary Examiner* — Glenn Dayoan
*Assistant Examiner* — Gregory Blankenship
(74) *Attorney, Agent, or Firm* — Rankin, Hill & Clark LLP (57) ABSTRACT

A vehicle body structure for fitting a pillar garnish and a fender panel is provided which surely prevents a space formed in the surface of a vehicle body from being viewed as black. The vehicle body structure includes a resin-made pillar garnish on a front surface side of a pillar of a vehicle body, a steel-made fender panel having an end on an end of the pillar garnish, and a seal member sealing a space between respective ends of the pillar garnish and the fender panel. The pillar garnish has an extending portion which extends in a direction from the end of the pillar garnish to the end of the fender panel. The fender panel has a flange which extends in a direction from the end of the fender panel to the end of the pillar garnish. The seal member is mounted on the extending portion and the flange.

7 Claims, 9 Drawing Sheets

VEHICLE BODY STRUCTURE FOR FITTING PILLAR GARNISH AND FENDER PANEL

CROSS-REFERENCE TO RELATED APPLICATION

The present application claims priority under 35 USC 119 to Japanese Patent Application No. 2009-239954 filed on Oct. 19, 2009 the entire contents of which are hereby incorporated by reference.

BACKGROUND OF THE INVENTION

1. Field of the Invention

The present invention relates to a vehicle body structure for fitting a pillar garnish and a fender panel to a vehicle body.

2. Description of the Related Art

According to conventional vehicle body structures, a pillar garnish (an A-pillar garnish) has, at both sides thereof, one side being smoothly merged with a window panel, and another side being also smoothly merged with a window glass. Also, the A-pillar garnish has a lower end smoothly merged with a fender panel. Accordingly, a stream-lined contour of a vehicle body is formed. There is proposed a technology related to fitting of an A-pillar garnish to a fender panel (see, fir example, JP 2000-177506 A). In order to provide a stream-lined contour to a window glass of a door which is arranged along the A-pillar garnish, an external garnish having a stream-lined contour as a whole formed continuously from an edge of the window glass is provided on a fender panel in a vehicle traveling direction from the window glass.

As the pillar garnish is smoothly merged with the window panel at one side of the pillar garnish, the fender panel is also smoothly merged with a front hood on one side of the fender panel. In a design which gives priority to the fitting of the fender panel to the front hood, a space may be formed between the fender panel and the bottom of the A-pillar garnish in some cases. Such a space is not desirable for a vehicle body with a stream-lined contour because it is viewed as black through human eyes, and gets attention. The blackness of the space can be suppressed by sealing the space by a seal member. However, it is necessary to surely hold the seal member so that the seal member does not fall in the space.

Moreover, when a design of an external garnish fitting to the shape of the edge of the window glass is prioritized, a space may be formed between the external garnish and the pillar garnish. As in the case of the foregoing space, this space is also viewed as black through human eyes and easily gets attention. This is not desirable for the vehicle body with a stream-lined contour. The reason why the space is viewed as black is that no light entering in the space comes out from that space at all. If a shade which reflects incoming light is provided right below the space, reflected light from the shade can prevent such a space from being viewed as black. However, as in the case of the foregoing seal member, it is necessary to surely hold the shade so that the shade does not fall in the space.

SUMMARY OF THE INVENTION

An object of the present invention is to provide a vehicle body structure for fitting a pillar garnish and a fender panel which can surely prevent a space formed in a surface of a vehicle body from being viewed as black.

In order to achieve the above object, a first aspect of the present invention provides a vehicle body structure for fitting a pillar garnish and a fender panel, and the vehicle body structure includes: a pillar garnish which is made of resin and which is provided on a front surface side of a pillar of a vehicle body; a fender panel which is made of steel and which has an end provided on an end of the pillar garnish; and a seal member which seals a space between respective ends of the pillar garnish and the fender panel, in which the pillar garnish is provided with an extending portion which extends in a direction from the end of the pillar garnish to the end of the fender panel, the fender panel is provided with a flange which extends in a direction from the end of the fender panel to the end of the pillar garnish, and the seal member is mounted on the extending portion and the flange.

According to this aspect, a space formed between the pillar garnish and the fender panel is sealed by the seal member. Accordingly, it is possible to prevent such a space from being viewed as black. Also, the seal member is mounted on the flange extending from the fender panel and the extending portion extending from the pillar garnish. Accordingly, the seal member is supported from both sides of the space, thereby enhancing the retaining strength of the seal member. That is, even if the width of the space is large, the seal member supported from both sides of the space is stably and surely retained, and can be retained regardless of the shape of the space.

Preferably, a second aspect of the present invention provides the vehicle body structure of the present invention, in which the width of a portion of the space where the extending portion is provided is wider than the width of a portion of the space where the flange is provided. According to this aspect, even if the space has a shape with a different width depending on a location, the extending portion of the pillar garnish made of resin having a high formability is enlarged according to the width of a wide portion and is provided at the wide portion, and thereby an area sufficient for mounting the seal member can be secured even in the wide portion.

Preferably, a third aspect of the present invention provides the vehicle body structure of the present invention, in which the extending portion has a hollow structure. According to this aspect, the strength of the extending portion can be enhanced, and the seal member can be surely retained. Also, since the pillar garnish is made of resin, the hollow structure can be easily formed in the extending portion of the pillar garnish.

A fourth aspect of the present invention provides the vehicle body structure of the present invention, further including a hinge cover which covers a hinge that supports a front hood to be openable, and the seal member is mounted continuously from the hinge cover in a direction in which the hinge cover extends.

According to this aspect, the seal member for sealing the space can be seen as an integral piece with the hinge cover, the seal member does not stand out, thereby improving the design characteristics.

A fifth aspect of the present invention provides the vehicle body structure of the present invention, further including an external garnish which is made of resin and which is arranged adjacent to the fender panel and the pillar garnish, and the external garnish is provided with a shade which is formed by injection molding in a merged part that faces the pillar garnish, and which extends inwardly of the vehicle body from a rear face of an external surface of the external garnish.

According to this aspect, in order to conform the shape to the fender panel made of steel, the space (merged part) formed between the external garnish made of resin and the pillar garnish may be large. Even in such a case, it is possible to prevent such a space from being viewed as black by the shade extending inwardly of the vehicle body from the rear face of the external surface of the external garnish. This is because the shade is arranged at a position where the shade can be seen through the space, light entering from the space illuminates the shade, and reflected light from the shade prevents the space from being viewed as black. Also, the shade is formed by injection molding, and thereby it can be surely retained.

According to the present invention, a vehicle body structure for fitting a pillar garnish and a fender panel is provided which can surely prevent a space formed in a surface of a vehicle body from being viewed as black.

DETAILED DESCRIPTION OF THE PREFERRED EMBODIMENT

A detailed explanation will be given of an embodiment of the present invention with reference to the accompanying drawings accordingly. The same structural element will be denoted by the same reference numeral through the whole drawings, and the duplicated explanation will be omitted below.

Figure 1:
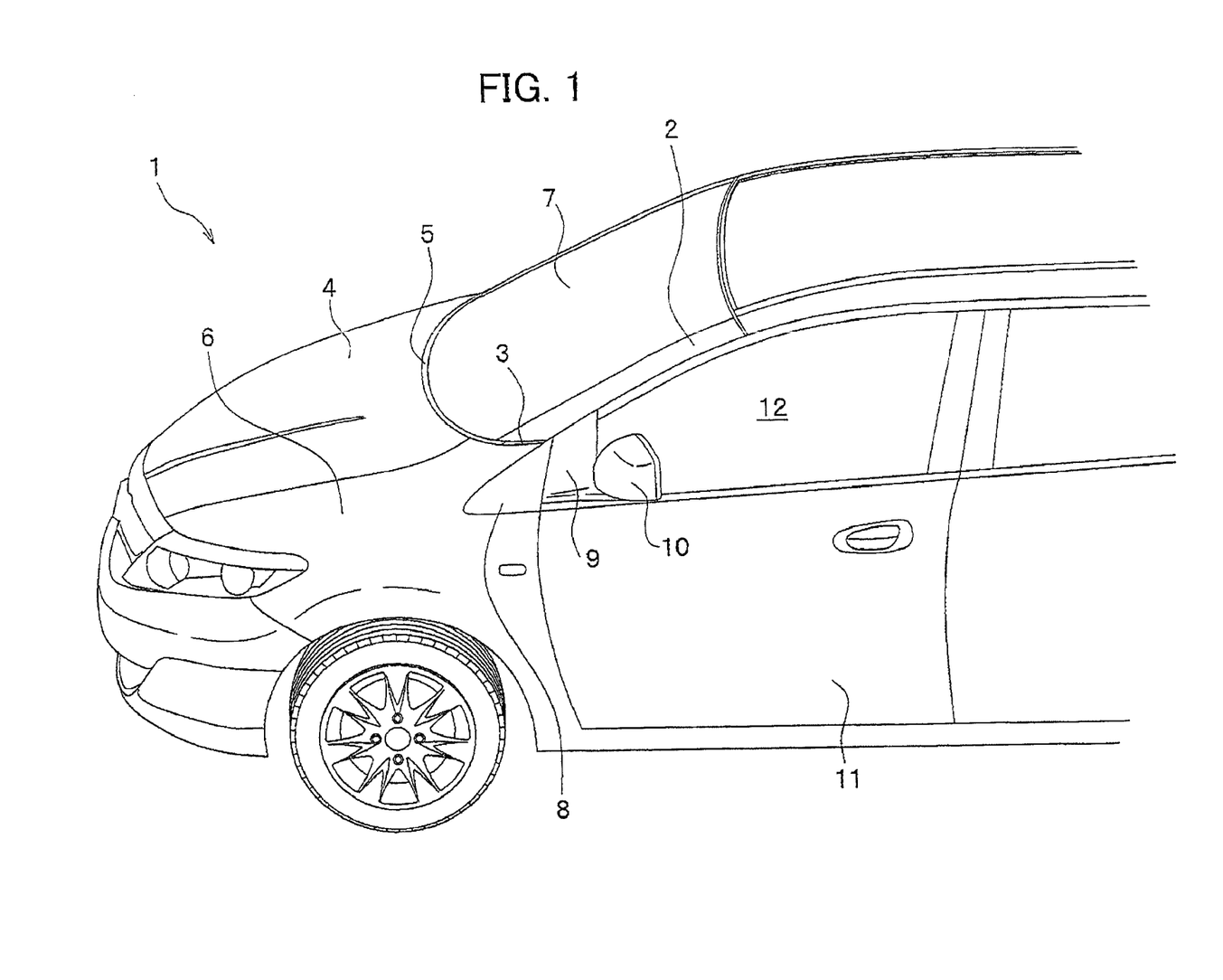
FIG. 1 is a perspective view showing a part of a vehicle body including a vehicle body structure for fitting a pillar garnish and a fender panel according to an embodiment of the present invention.

FIG. 1 shows a vehicle body 1 having a vehicle body structure for fitting a pillar garnish and a fender panel according to the embodiment of the present invention. In the vehicle body 1, a stream-lined contour is formed from a window panel 7 to a front hood 4. A hinge cover 5 is provided across both sides of the vehicle body, and covers a hinge (not shown) that supports the front hood 4 to be openable. In order to protect respective A-pillars (not shown) made of steel, resin-made A-pillar garnishes 2 are provided on the surface of respective A-pillars at both sides of the window panel 7. Each A-pillar garnish 2 has an external surface having one side smoothly merged with an external surface of the window panel 7, and another side smoothly merged with a door sash where a window glass 12 of a door 11 is provided. Also, provided between a lower end of the A-pillar garnish 2 and a fender panel 6 is a seal member 3, and the A-pillar garnish 2 has the lower end where the external surface of the A-pillar garnish 2 is smoothly merged with the fender panel 6 made of steel through the seal member 3. The seal member 3 is arranged continuously to the hinge cover 5 in a direction in which the hinge cover 5 extends. Accordingly, a stream-lined contour from the A-pillar garnish 2 to the fender panel 6 is formed. The fender panels 6 are provided at both sides of the front hood 4, and each fender panel 6 and the front hood 4 have respective external surfaces smoothly merged with each other.

In order to also give a stream-lined contour to the window glass 12 arranged along the A-pillar garnish 2, a door garnish 9 where a side mirror 10 is provided, and an external garnish 8 are provided in a traveling direction of the vehicle body 1 from the window glass 12. Individual edges of the door sash where the window glass 12 is provided, the door garnish 9, and of the external garnish 8 are formed continuously to produce a stream-lined contour. The door garnish 9 is fixed to the door 11, and the external garnish 8 is fixed to an outer panel of the vehicle body 1.

Figure 2:
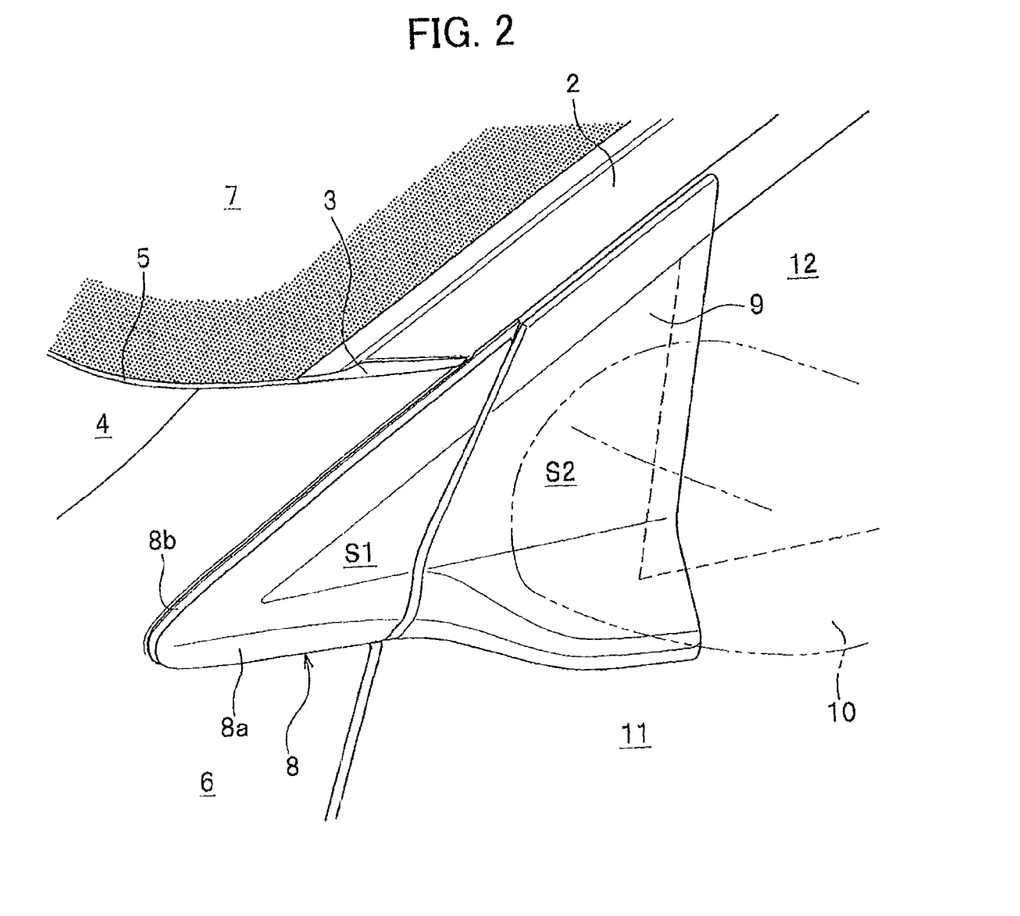
FIG. 2 is an enlarged view around an external garnish shown in FIG. 1.

FIG. 2 is an enlarged view around the external garnish 8 shown in FIG. 1. An external surface S1 of the external garnish 8, an external surface S2 of the door garnish 9, and the external surface of the window glass 12 are parallel to one another, and are arranged on a substantially same plane, and the external surfaces S1, S2 of the external garnish 8 and the door garnish 9 are provided along a direction in which the window glass 12 extends. Since the external garnish 8, the door garnish 9, and the door sash where the window glass 12 is provided can be viewed as being integral, a stream-lined contour formed by those members can be clearly impressed. The external garnish 8 is made of resin, and has a base part 8a having the external surface S1, and a lip 8b closely contacting the fender panel 6 on a part of the upper side of the end of the external garnish 8. The lip 8b has an upper part arranged so as to face a part of the side of the A-pillar garnish 2. A space between the upper part of the lip 8b and the side of the A-pillar garnish 2 is prevented from being viewed as black according to this embodiment.

Also, according to this embodiment, a space formed between the lower end of the A-pillar garnish 2 and the fender panel 6 is sealed by the seal member 3, so as to be prevented from being viewed as black. In the following explanation, first, the seal member 3 will be explained in more detail, and then an effect of preventing the space formed between the upper part of the lip 8b and the side of the A-pillar garnish 2 from being viewed as black will be explained.

Figure 3:
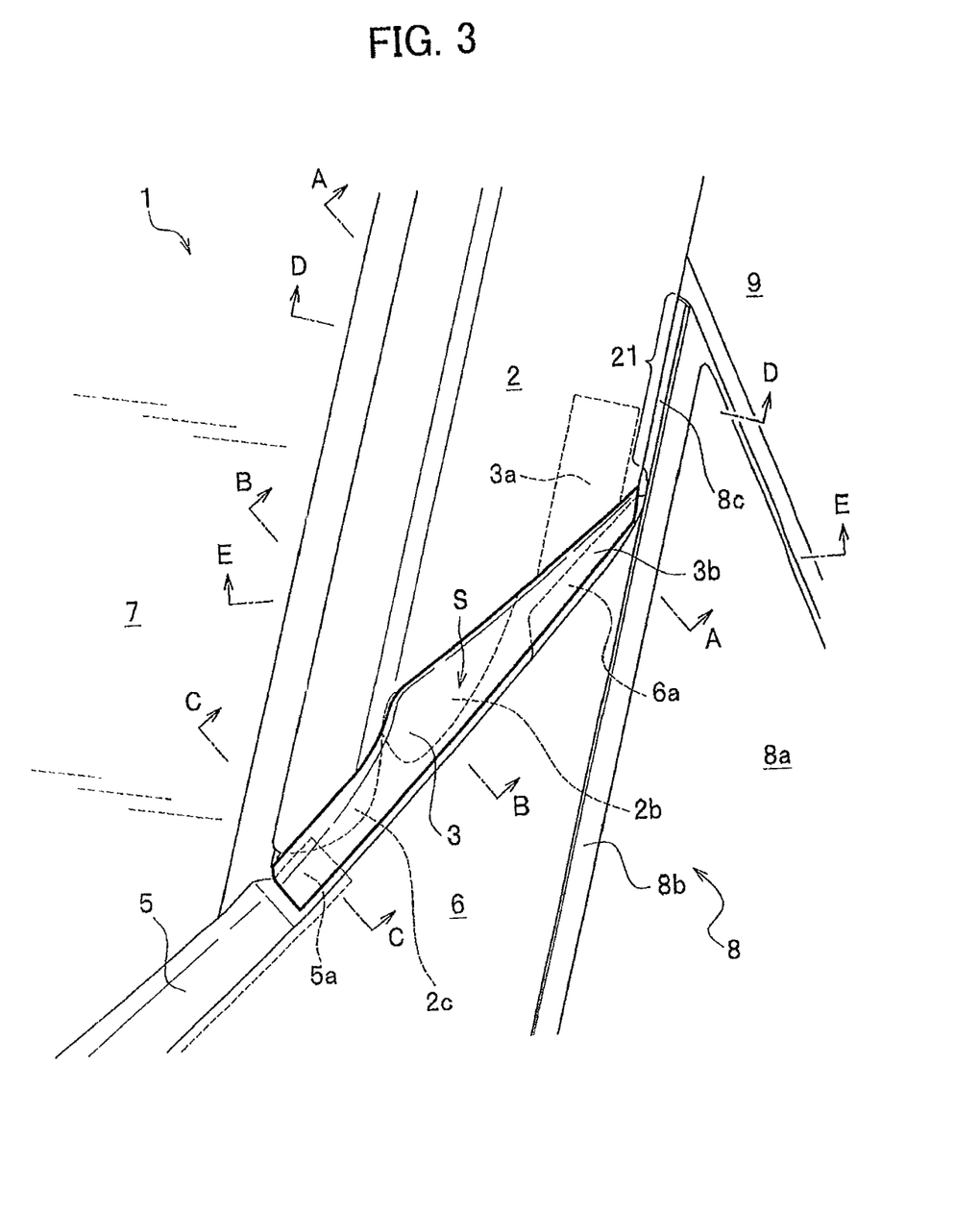
FIG. 3 is an enlarged view around a seal member in the vicinity of the external garnish shown in FIG. 2.

FIG. 3 is an enlarged view around the seal member 3 shown in FIG. 2. The seal member 3 is arranged continuously from the hinge cover 5 in a direction in which the hinge cover 5 extends. An extending part 5a of the hinge cover 5 is thinner than portions other than the extending part 5a of the hinge cover 5, and the seal member 3 is mounted so as to overlap the upper side (external side) of the thin extending part 5a, thereby supporting the seal member 3. Also, as the seal member 3 is mounted on the upper side (external side) of the thin extending part 5a, the seal member 3 is designed so as to have a thickness substantially equal to the thickness of a portion of the hinge cover 5 other than the extending part 5a. According to this structure, since the seal member 3 and the hinge cover 5 can be seen as an integral piece, the seal member 3 does not stand out, thereby improving the design characteristics.

The upper end of the fender panel 6 is provided below the lower end of the A-pillar garnish 2. The seal member 3 is provided in order to seal the space between the end of the A-pillar garnish 2 and the end of the fender panel 6.

The A-pillar garnish 2 is provided with a first extending portion 2b and a second extending portion 2c both extending in a direction from the lower end of the A-pillar garnish 2 toward the upper end of the fender panel 6. The fender panel 6 is provided with a flange 6a extending in a direction from the upper end of the fender panel 6 toward the lower end of the A-pillar garnish 2. The seal member 3 is mounted on and supported by the first extending portion 2b, the second extending portion 2c, the flange 6a, and the extending part 5a of the hinge cover 5.

The seal member 3 seals the space formed between the A-pillar garnish 2 and the fender panel 6 so as to prevent such a space from being viewed as black, and an exposed surface S of the seal member 3 gives the smooth merging of respective external surfaces from the A-pillar garnish 2 to the fender panel 6. Since the seal member 3 is mounted on the flange 6a extending from the fender panel 6 and on the first and second extending portions 2b, 2c both extending from the A-pillar garnish 2, the seal member 3 is supported from both sides thereof. Since the seal member 3 is mounted on the flange 6a extending from the fender panel 6 and on the extending part 5a of the hinge cover 5, the seal member 3 is supported from both ends thereof. Also, a support 3a extends from the seal member 3 to the rear surface of the A-pillar garnish 2. The support 3a is integrated with the main body of the seal member 3, and is fixed to the rear surface of the A-pillar garnish 2. The support 3a hangs up the main body of the seal member 3 so as not to be detached. Accordingly, the retained strength of the seal member 3 is enhanced.

The width of the seal member 3 on a part of the first and second extending portions 2b, 2c is wider than the width of the seal member on a part of the flange 6a. The reason of this arrangement is the following. The A-pillar garnish 2 is made of resin and therefore the first and second extending portions 2b, 2c extending therefrom are also made of resin. On the other hand, the fender panel 6 is made of steel and therefore the flange 6a extending therefrom is also made of steel. Resin has a higher formability than that of steel. Therefore, a large extending portion can be easily formed.

Note that it will be discussed later but the side of the A-pillar garnish 2 and the lip 8b of the external garnish 8 are arranged so as to face each other, thereby forming a merged part 21. A first shade 8c extending inwardly of the vehicle body 1 from the rear face of the external surface of the external garnish 8 can be seen through a space between the lip 8b and the side of the A-pillar garnish 2 of the merged part 21. Accordingly, it is possible to prevent the space from being viewed as black.

Figure 4:
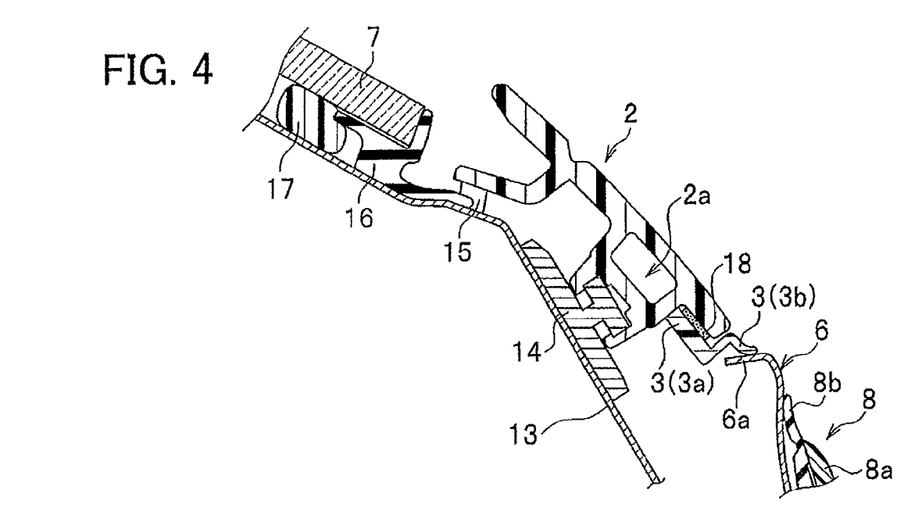
FIG. 4 is a cross-sectional view along a line A-A in FIG. 3.

FIG. 4 is a cross-sectional view along a line A-A in FIG. 3. The window panel 7 is supported by a pillar 13 through a molding 16, and is fixed thereto by means of a bond 17. The A-pillar garnish 2 is supported by the pillar 13 through a support member 14 such as a clip. A seal member 15 is provided on the pillar 13 and the lip of the molding 16 extending on the pillar 13. The A-pillar garnish 2 is provided with a hollow structure 2a that passes all the way through from the upper end of the A-pillar garnish 2 to the lower end thereof along the vertical (lengthwise) direction. The hollow structure 2a enhances the strength of the A-pillar garnish 2.

The support 3a of the seal member 3 is bonded and fixed on the rear face of the external surface of the lower end of the A-pillar garnish 2 using a double-face tape 18. The seal member 3 is so formed as to be integral from the support 3a on the rear side of the A-pillar garnish 2 to the lip 3b that runs onto the front surface of the flange 6a of the fender panel 6. The external surface of the lip 3b corresponds to a part of the exposed surface S shown in FIG. 3. The lip 3b of the seal member 3 is supported by the flange 6a from underneath, and is hung by the support 3a. Thereby, the seal member 3 can be surely supported. Note that the lip 8b of the external garnish 8 closely contacts the fender panel 6.

Figure 5:
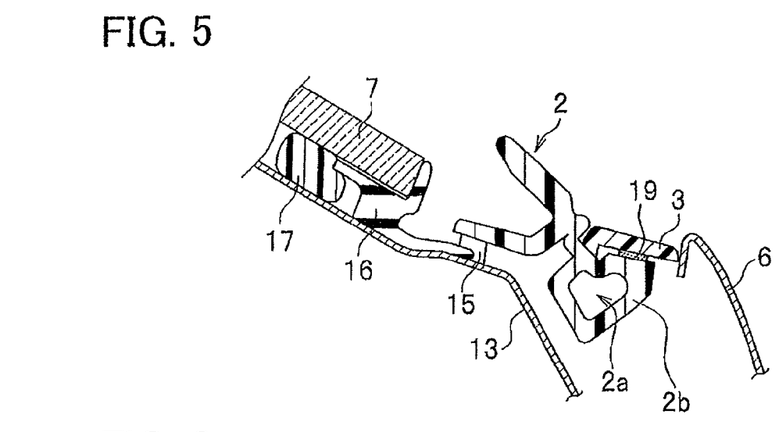
FIG. 5 is a cross-sectional view along a line B-B in FIG. 3.

FIG. 5 is a cross-sectional view along a line B-B in FIG. 3. The seal member 3 is bonded and fixed on the first extending portion 2b of the A-pillar garnish 2 using a double-face tape 19. The foregoing hollow structure 2a extends in the first extending portion 2b. The hollow structure 2a can enhance the strength of the first extending portion 2b and the joining strength between the first extending portion 2b and the main body of the A-pillar garnish 2, thereby surely retaining the seal member 3. Also, since the A-pillar garnish 2 is made of resin, a hollow structure can be easily formed in the first extending portion 2b which is made of resin and which is integrally formed with the A-pillar garnish 2.

Figure 6:
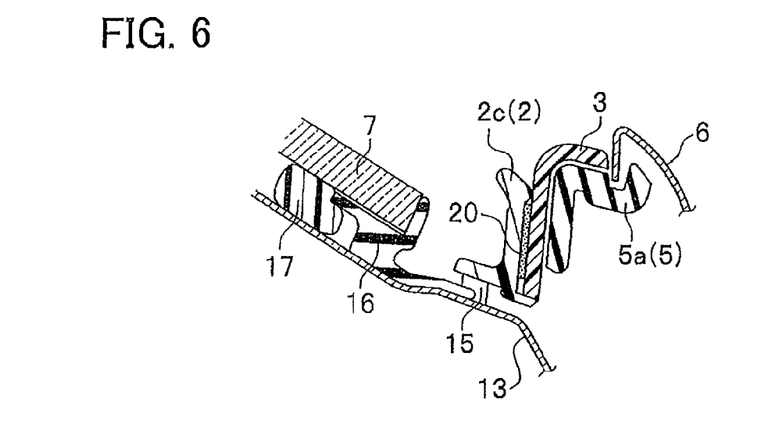
FIG. 6 is a cross-sectional view along a line C-C in FIG. 3.

FIG. 6 is a cross-sectional view along a line C-C in FIG. 3. The seal member 3 is bonded and fixed on the second extending portion 2c of the A-pillar garnish 2 using a double-face tape 20. Also, the seal member 3 is supported by the extending part 5a of the hinge cover 5 from underneath. Accordingly, the seal member 3 is surely retained.

Figure 7:
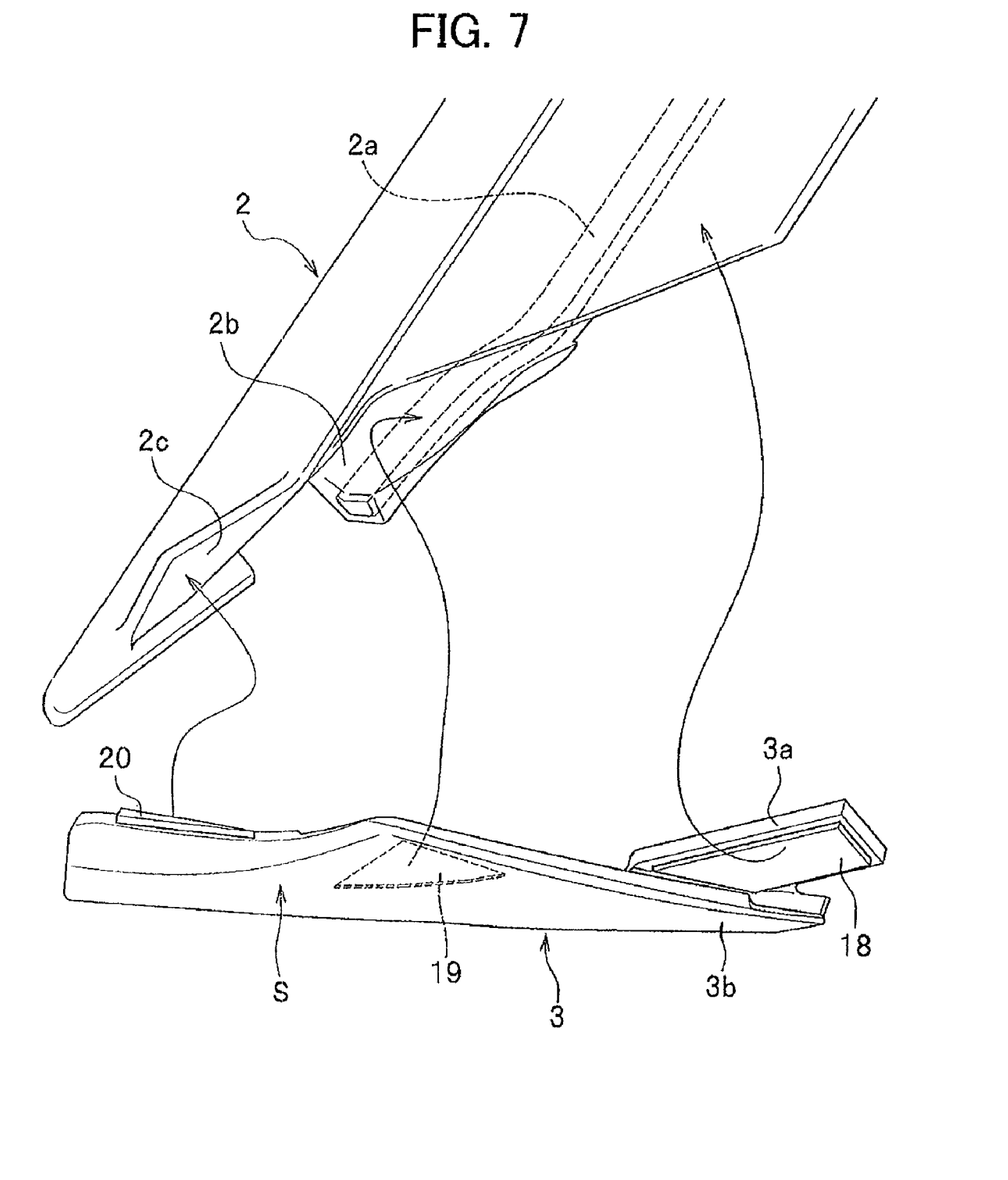
FIG. 7 is a diagram showing how to attach the seal member to an A-pillar garnish.

Next, with reference to FIG. 7, an explanation will be given of how to attach the seal member 3 to the A-pillar garnish 2. The hollow structure 2a extends from the main body of the A-pillar garnish 2 to the first extending portion 2b. Although the double-face tapes 18, 19, and 20 can be put on either one of the A-pillar garnish 2 and the seal member 3 at first, they are put on the seal-member-3 side at first in FIG. 7. The double-face tapes 18, 19, and 20 are then put on the A-pillar garnish 2 at portions corresponding to respective leading ends of arrows. The double-face tape 18 is put on the exposed-surface-S side of the support member 3a, and put on the rear face of the main body of the A-pillar garnish 2 other than the first and second extending portions 2b, 2c. The double-face tape 19 is put on the rear-face side of the exposed surface S of the seal member 3, and put on the front surface of the first extending portion 2b of the A-pillar garnish 2. The double-face tape 20 is put on the side-face side of the seal member 3 successive from the exposed surface S, and put on the side face (upstanding face) of the second extending portion 2c of the A-pillar garnish 2.

Figure 8:
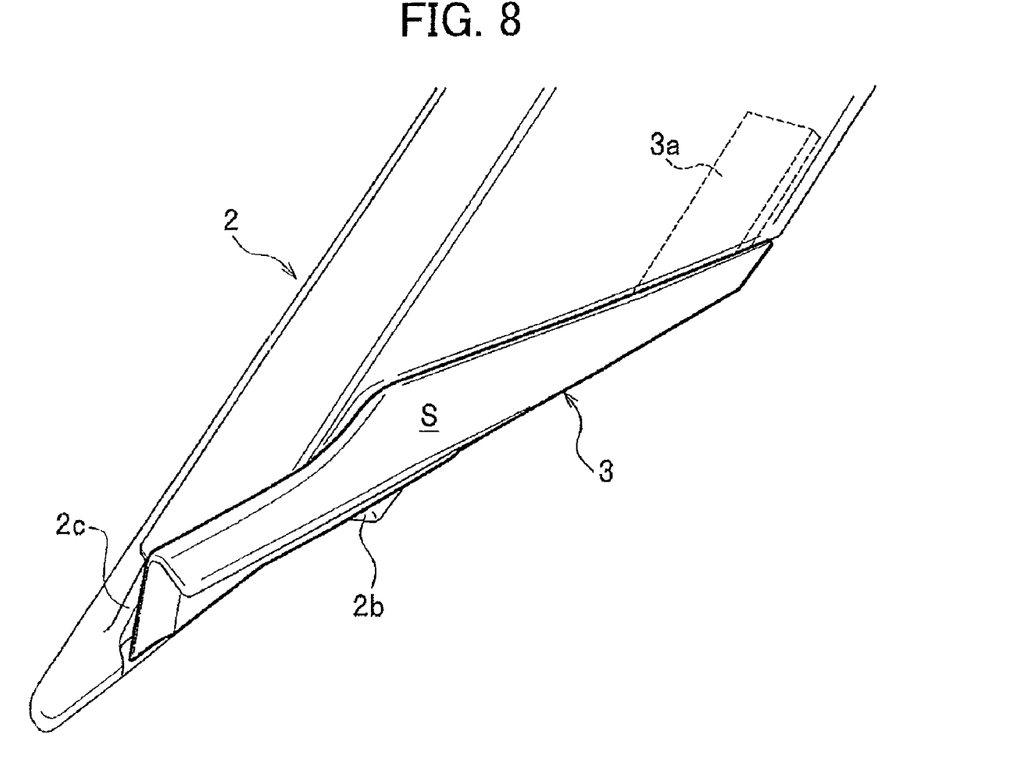
FIG. 8 is a perspective view of the A-pillar garnish to which the seal member is attached.

FIG. 8 shows the A-pillar garnish 2 to which the seal member 3 is attached. In FIG. 8, those pieces are viewed from the front of the exposed surface S. As is clear from this figure, the seal member 3 is mounted on the first and second extending portions 2b, 2c, and hung by the support member 3a.

Next, an explanation will be given of an effect of preventing the space formed between the upper part of the lip 8b of the external garnish 8 and the side of the A-pillar garnish 2 from being viewed as black which has been explained with reference to FIG. 3.

Figure 9:
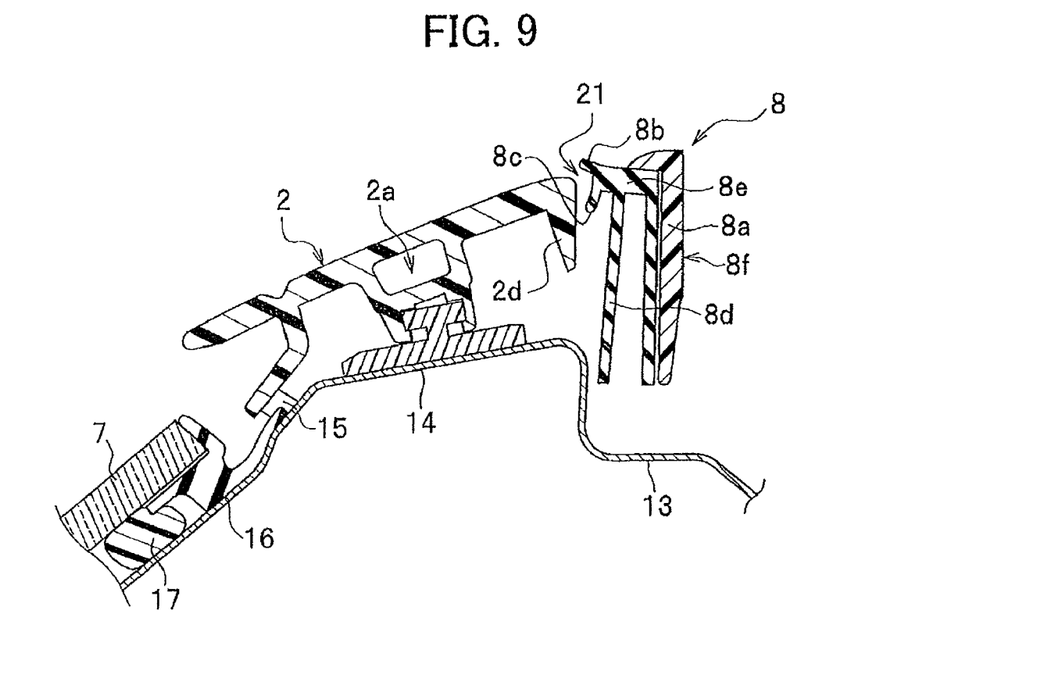
FIG. 9 is a cross-sectional view along a line D-D in FIG. 3.

FIG. 9 is a cross-sectional view along a line D-D in FIG. 3. A side 2d of the A-pillar garnish 2 and the lip 8b of the external garnish 8 are arranged so as to face each other, thereby forming the merged part 21. The first shade 8c extending inwardly of the vehicle body 1 from the rear face of the external surface of the external garnish 8 can be seen through the space formed between the lip 8b and the side 2d of the A-pillar garnish 2 of the merged part 21. Also, relative to the lip 8b (the merged part 21), a second shade 8d is provided behind the first shade 8c. The second shade 8d also extends inwardly of the vehicle body 1 from the rear face of the external surface of the external garnish 8, but is longer than the first shade 8c in an inward direction from the vehicle body 1. Accordingly, the second shade 8d can be seen behind the first shade 8c through the space of the merged part 21. Since the first shade 8c and the second shade 8d can be seen through the merged part 21 (the space), it is possible to prevent the space from being viewed as black.

Figure 10:
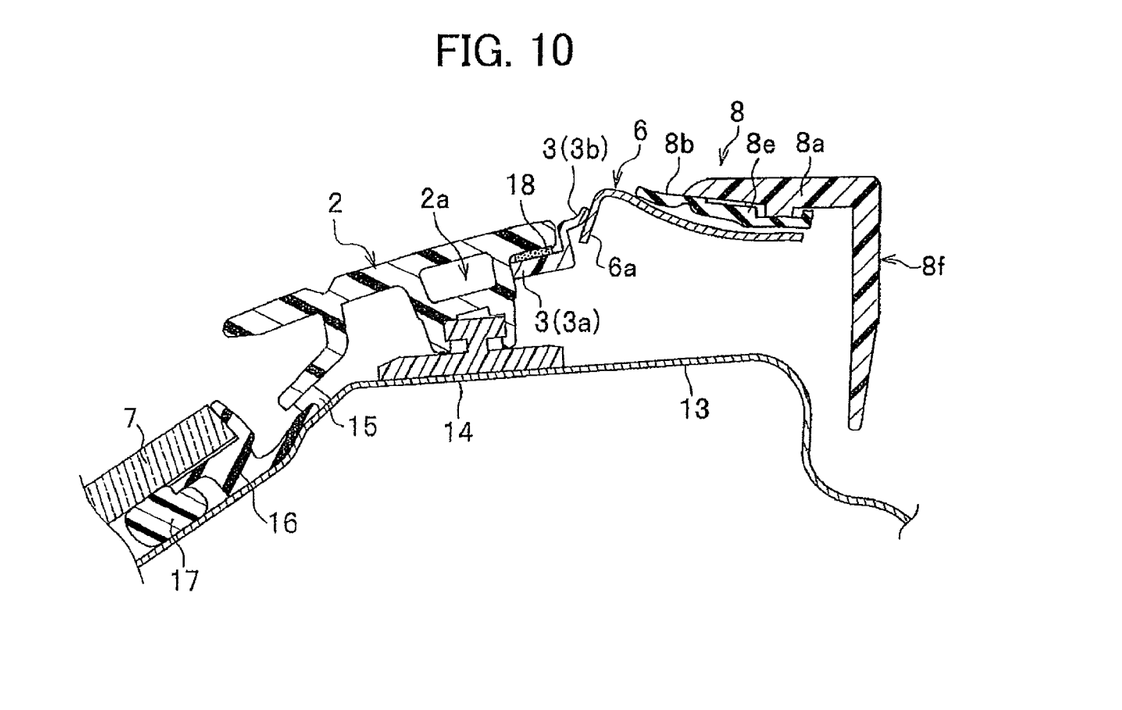
FIG. 10 is a cross-sectional view along a line E-E in FIG. 3.

The lip 8b, the first shade 8c, and the second shade 8d are supported by a lip base part 8e. The lip 8b, the first shade 8c, the second shade 8d, and the lip base part 8e are all made of resin, and are integrally formed by injection molding. The lip base part 8e is fixed to the base part 8a of the external garnish 8. The base part 8a forms the external surface S1 which has been explained with reference to FIG. 2, and a door-facing side face 8f of the base part 8a faces the door 11. The lip 8b has a portion, which is not in the merged part 21, closely contacting the fender panel 6 as shown in FIG. 10. The lip 8b is supported by the lip base part 8e, and the lip base part 8e is fixed to the base part 8a of the external garnish 8. The lip base part 8e is formed along the external surface of the fender panel 6.

Figure 11:
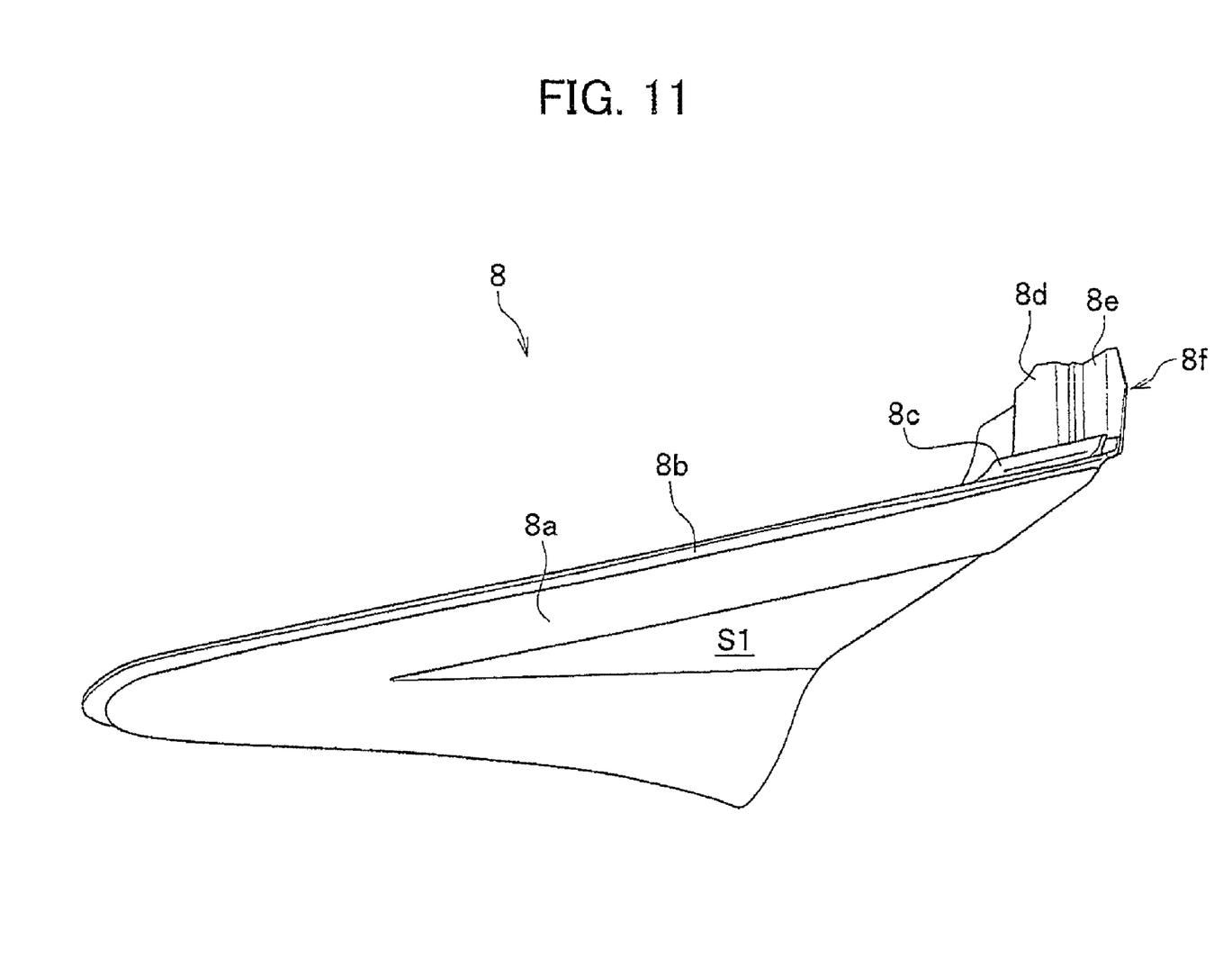
FIG. 11 is a top view of the external garnish.

FIG. 11 is a top view showing the external garnish 8. The lip 8b is provided on the upper side of the external garnish 8 behind (rearwardly of) the base part 8a, the first shade 8c is provided behind the lip 8b, and the second shade 8d is provided behind the first shade 8c. The second shade 8d is joined with the door-facing side face 8f.

Figure 12:
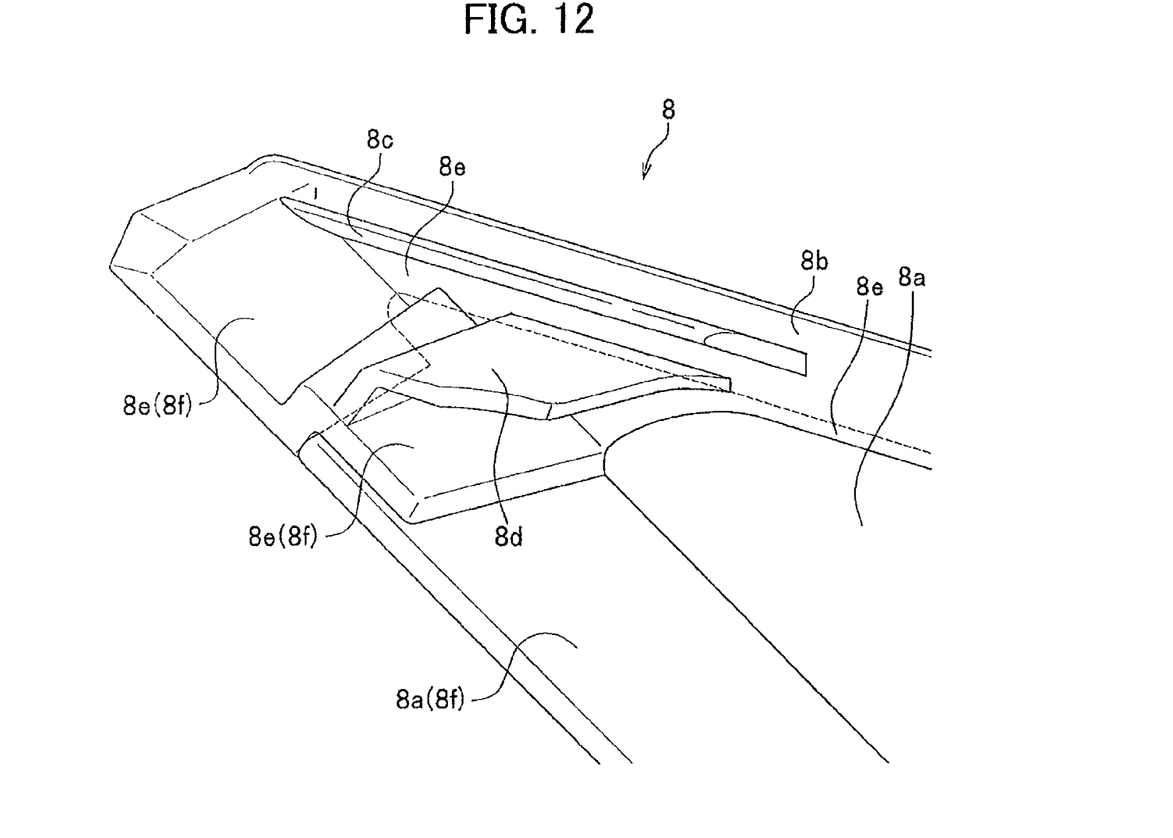
FIG. 12 is a rear view showing a top part of the external garnish.

FIG. 12 is a rear view showing the upper part of the external garnish 8. The door-facing side face 8f is formed by the base part 8a and the lip base part 8e, which are bonded so as to overlap with each other in the vicinity of the second shade 8d. The lip base part 8e forming the door-facing side face 8f and the second shade 8d are joined together on a side of the second shade 8d. The lip base part 8e is provided from the door-facing side face 8f along another side of the second shade 8d, the first shade 8c, and the lip 8b. The lip base part 8e, the second shade 8d, the first shade 8c, and the lip 8b are integrally formed by injection molding.

When the first shade 8c is extended and elongated inwardly of the vehicle body 1 so as to abut the side 2d of the A-pillar garnish 2 or when the second shade 8d is extended and elongated inwardly of the vehicle body 1 so as to abut the pillar 13, it is possible to further prevent the space of the merged part 21 from being viewed as black.

What is claimed is:

1. A vehicle body structure for fitting a pillar garnish and a fender panel, comprising:
   a pillar garnish which is made of resin and which is provided on a front surface side of a pillar of a vehicle body;
   a fender panel which is made of steel and which has an end provided on an end of the pillar garnish; and
   a seal member which seals a space between respective ends of the pillar garnish and the fender panel, wherein
   the pillar garnish is provided with an extending portion which extends in a direction from the end of the pillar garnish to the end of the fender panel,
   the fender panel is provided with a flange which extends in a direction from the end of the fender panel to the end of the pillar garnish, and
   the seal member is supported by a top surface of the extending portion and a top surface of the flange.

2. The vehicle body structure according to claim 1, wherein a width of the seal member covering the extending portion is wider than a width of the seal member covering the flange.

3. The vehicle body structure according to claim 1, wherein the extending portion has a hollow structure.

4. The vehicle body structure according to claim 1, further comprising a hinge cover which covers a hinge that supports a front hood to be openable, wherein the seal member is mounted continuously from the hinge cover in a direction in which the hinge cover extends.

5. The vehicle body structure according to claim 1, wherein
   the extending portion extends a lower end of the pillar garnish;
   the flange is bent downward under a surface of the fender panel; and,
   an exposed surface of the seal member, an external surface of the pillar garnish, and an external surface of the fender panel constitute a continuous smooth surface.

6. The vehicle body structure according to claim 1, wherein:
   said pillar garnish having a length direction extending along the pillar, said length direction being along said pillar garnish from a pillar garnish upper end adjacent a vehicle roof to a pillar garnish lower end adjacent said fender;
   said fender panel upper end faces toward the lower end of the pillar garnish; and
   said seal member sealing a space between the lower end of the pillar garnish and the upper end of the fender panel, wherein
   the pillar garnish extending portion extends from the lower end of the pillar garnish toward the upper end of the fender panel,
   the fender panel flange extends from the upper end of the fender panel toward the lower end of the pillar garnish, and
   the seal member seals the space between the lower end of the pillar garnish and the upper end of the fender panel.

7. A vehicle body structure for fitting a pillar garnish and a fender panel, comprising:
   a pillar garnish, said pillar garnish being made of resin and being provided on a front surface side of a pillar of a vehicle body;
   a fender panel, said fender panel being made of steel and having an end provided on an end of the pillar garnish; and
   a seal member, said seal member sealing a space between respective ends of the pillar garnish and the fender panel, wherein
   the pillar garnish is provided with an extending portion that extends in a direction from the end of the pillar garnish to the end of the fender panel,
   the fender panel is provided with a flange that extends in a direction from the end of the fender panel to the end of the pillar garnish,
   the seal member is mounted on the extending portion and the flange,
   an external garnish that is made of resin and arranged adjacent to the fender panel and the pillar garnish,
   wherein the external garnish is provided with a shade, said shade being formed by injection molding in a merged part that faces the pillar garnish, and that extends inwardly of the vehicle body from a rear face of an external surface of the external garnish.

* * * * *